Patented May 9, 1950

2,507,192

UNITED STATES PATENT OFFICE 2,507,192

PREPARATION OF N-METHYL p-AMINO-PHENOL

Maurice Ernest Bouvier, St.-Didier au Mont d'Or, France, assignor to Societe des Usines Chimiques Rhone-Poulenc, Paris, France, a French company No Drawing. Application October 23, 1945, Serial No. 624,082. In France October 17, 1944

Section 1, Public Law 690, August 8, 1946
Patent expires October 17, 1964

8 Claims. (Cl. 260—574)

This invention relates to improvements in hydrogenation processes and is more particularly concerned with the manufacture of N-methyl-para-aminophenol by an hydrogenation procedure.

It is known that para-aminophenol reacts in a neutral or alkaline medium with formaldehyde to yield methylene-para-aminophenol. It is likewise known that this compound, either in its monomeric form or in a more or less polymerised form, can under certain conditions absorb hydrogen, either in the nascent state or in the molecular state in the presence of a catalyst, to yield, at least in part, N-monomethyl-para-aminophenol, the sulphate of which is a commonly used photographic reagent. Actually, the only catalytic hydrogenation described in chemical literature for obtaining para-methyl-aminophenol was carried out by means of palladised charcoal as catalyst, and it would appear that this catalyst is specific for this reaction since the usual hydrogenation catalysts do not yield the same result. Thus, it has been recorded that on catalytic hydrogenation of methylene-para-aminophenol in the presence of nickel, the para-aminophenol starting material is regenerated.

It is an object of this invention to provide a process for the catalytic hydrogenation of methylene-para-aminophenol wherein any usual hydrogenation catalyst can be employed and a high yield of N-methyl-para-aminophenol obtained. A further object of this invention is to provide overall improvements in the catalytic conversion of methylene-para-aminophenol to the N-methyl derivative.

According to the present invention, it has now been found that it is possible to obtain N-monomethyl-para-aminophenol in excellent yield by catalytic hydrogenation of methylene-para-aminophenol by means of the ordinary hydrogenation catalysts provided that the operation is carried out in the presence of the stoichiometric quantity of caustic alkali corresponding to the alkali metal derivative of the phenolic compound, and in a methyl alcohol medium.

Instead of methylene-para-aminophenol, its constituents may be employed, that is to say para-aminophenol and formaldehyde, in equimolecular proportions. In this case, the formaldehyde can be employed either in the form of an aqueous solution (formol) or in the form of polyoxymethylene. As hydrogenation catalyst active nickel, and in particular "Raney" nickel, has given very good results; with this catalyst ordinary temperature with or without pressure can be employed in the hydrogenation.

As caustic alkali caustic soda may be used, for example, at the rate of one mol per mol of methylene-para-aminophenol; it is likewise possible to utilise sodium methoxide, again in the same molecular proportion.

In order to obtain optimum yield, it is necessary so to adjust the quantity of methyl alcohol employed that at the termination of the reaction the alcohol does not contain more than 20% of water. This precaution is especially necessary when para-aminophenol and formol are employed as starting materials.

The reaction proceeds smoothly at ordinary temperature and under atmospheric pressure; nevertheless other conditions of temperature and pressure may be utilised, if desired.

In addition to the desired N-methyl-para-aminophenol, the reaction mixture contains small quantities of untransformed para-aminophenol and of N-dimethyl-para-aminophenol. The separation of these different constituents is effected by known methods.

The following example, in which the parts stated are parts by weight, illustrates the invention without restricting it in any way.

Example

A hydrogenating apparatus is charged in a hydrogen atmosphere with:

22 parts of para-aminophenol
200 parts of methyl alcohol, containing
8 parts of caustic soda.

To the resulting solution is added the hydrogenation catalyst (Raney nickel). The apparatus, which is connected to a source of hydrogen, is mechanically agitated. There is then poured in, during about 30 minutes, 20 parts of formol (30% by weight) diluted if required, with methyl alcohol. The absorption of hydrogen is rapid; it depends on the rate of introduction of the formol, the quantity of catalyst employed, the temperature and the pressure. At ordinary pressure, starting at 35° C. and in the presence of a suitable quantity of nickel the absorption is completed in 45 to 50 minutes, a rise in temperature of about ten degrees being observed. The catalyst is separated and washed with methyl alcohol by decanting or filtering; the washed catalyst can then be re-used.

The clear, colourless or very slightly tinted solution is treated in manner known per se to recover and separate the different reaction products. For instance, the following procedure may be employed:

The alcoholic solution of the phenolic sodium salts is neutralised or rendered slightly acid by the addition of an acid (acetic acid) so as to provide in solution the bases in the form of neutral salts (acetates of the bases) which are much less sensitive to oxidation than the free bases. The methyl alcohol is then driven off by distillation. The residue dissolved in water is treated with controlled quantities of benzaldehyde to separate all the para-aminophenol, which may be present, in the form of insoluble benzylidene-para-aminophenol which is separated by filtration. The mother liquor is rendered alkaline to phenolphthalein by the addition of sodium carbonate, and the bases liberated are extracted by means of a suitable solvent (ether); after distillation of the solvent they are dissolved in alcohol. The N-monomethyl-para-aminophenol is separated therefrom in the form of its neutral sulphate, for instance, by the known method viz. by the controlled addition of sulphuric acid, until the solution is just acid to litmus.

As regards the dimethyl derivative, it can be separated from the mother liquor by one of the known methods.

In the example described above, 5% of the para-aminophenol utilised is recovered in the form of benzylidene-para-aminophenol (from which it can be recovered easily and quantitatively) and 83% in the form of the monomethyl derivative (88% if account is taken of the quantity obtainable from the benzylidene-para-aminophenol).

I claim:

1. Process for the manufacture of N-methyl-para-aminophenol which comprises passing hydrogen into a solution of a member of the class consisting of methylene-para-aminophenol and an equimolecular mixture of formaldehyde and para-aminophenol in a methyl alcoholic medium which contains a nickel catalyst and a member of the class consisting of caustic alkalies and their methoxides.

2. Process for the manufacture of N-methyl-para-aminophenol which comprises passing hydrogen into a solution of a member of the class consisting of methylene-para-aminophenol and an equimolecular mixture of formaldehyde and para-aminophenol in a methyl alcoholic medium which contains a nickel catalyst and a member of the class consisting of caustic alkalies and their methoxides, said latter member being present in amount stoichiometrically equivalent to said phenolic compound.

3. Process for the manufacture of N-methyl-para-aminophenol which comprises passing hydrogen into a solution of a member of the class consisting of methylene-para-aminophenol and an equimolecular mixture of formaldehyde and para-aminophenol in a methyl alcoholic medium which contains a Raney nickel catalyst and a member of the class consisting of caustic alkalies and their methoxides.

4. Process for the manufacture of N-methyl-para-aminophenol which comprises passing hydrogen into a solution of a member of the class consisting of methylene-para-aminophenol and an equimolecular mixture of formaldehyde and para-aminophenol in a methyl alcoholic medium which contains a Raney nickel catalyst and a member of the class consisting of caustic alkalies and their methoxides, said latter member being present in amount stoichiometrically equivalent to said phenolic compound.

5. Process for the manufacture of N-methyl-para-aminophenol which comprises passing hydrogen into a solution of methylene-para-aminophenol in methyl alcoholic medium containing Raney nickel catalyst and a quantity of caustic soda stoichiometrically equivalent to the quantity of methylene-para-aminophenol employed.

6. Process according to claim 5 in which the quantity of methyl alcohol employed is so adjusted that at the end of the hydrogenation it contains a quantity of water not greater than 20% by weight.

7. Process for the manufacture of N-methyl-para-aminophenol which comprises hydrogenating a member of the class consisting of methylene-para-aminophenol and an equimolecular mixture of formaldehyde and para-aminophenol in methyl alcoholic medium which contains a Raney nickel catalyst and a quantity of caustic alkali stoichiometrically equivalent to the quantity of phenolic compound employed, at the end of the hydrogenation adding to the reaction mixture an acid to form a neutral salt of the bases present, removing the methyl alcohol from said mixture, treating the residue with benzaldehyde, filtering off the resulting insoluble substances, rendering the mother liquor alkaline to phenolphthalein, extracting the bases thus liberated with inert organic solvent and dissolving the residue in alcohol and separating therefrom N-methyl-para-aminophenol in the form of its sulphate.

8. Process according to claim 7 wherein the hydrogenation is effected at normal temperature and pressure.

MAURICE ERNEST BOUVIER.

REFERENCES CITED

The following references are of record in the file of this patent:

UNITED STATES PATENTS

| Number | Name | Date |
| --- | --- | --- |
| 1,886,449 | Sommer et al. | Nov. 8, 1932 |
| 2,298,284 | Emerson | Oct. 13, 1942 |